(12) United States Patent
Kimble (10) Patent No.: US 6,286,631 B1
(45) Date of Patent: Sep. 11, 2001

(54) ACTUATING LEVER FOR A WHEELBARROW BRAKE

(75) Inventor: Michael E. Kimble, Lawrenceville, PA (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 09/698,727

(22) Filed: Oct. 27, 2000

(51) Int. Cl.$^7$ ........................................ B62B 5/04
(52) U.S. Cl. ............................................... 188/19
(58) Field of Search ........................ 188/19, 72.7–72.9, 188/196; 280/47.31

(56) References Cited

U.S. PATENT DOCUMENTS 5,000,294 * 3/1991 Hunicutt et al. ................ 188/71.9
5,038,895 * 8/1991 Evans ............................ 188/72.7
5,203,434 * 4/1993 Teeter et al. .................. 188/70 R
5,343,984 * 9/1994 Bieker et al. .................. 188/71.9
5,690,191 * 11/1997 Burbank ........................ 188/2 D
6,148,964 * 11/2000 Huang .............................. 188/26

* cited by examiner

Primary Examiner—Christopher P. Schwartz
(74) Attorney, Agent, or Firm—Drinker Biddle & Reath LLP (57) ABSTRACT

An actuator for a brake system includes variable depth cam grooves on a pivotable lever which slide on spherical cam members moveably supported by a caliper for braking the disc portion of a disc assembly. An intermediately located maximum depth for the cam grooves provides for actuation of the caliper assembly in either of opposing first or second directions of pivot of the lever from a minimum separation position of the lever.

22 Claims, 6 Drawing Sheets

ACTUATING LEVER FOR A WHEELBARROW BRAKE

FIELD OF THE INVENTION

The present invention relates to wheelbarrow brakes and more particularly to an actuating lever for a braking system having a caliper for braking a rotatably supported disc.

BACKGROUND OF THE INVENTION

Braking systems for wheelbarrows are known in the art. U.S. Pat. No. 2,716,031 to Roessler, for example, discloses a hand operated brake for a wheelbarrow having a pivoting hand lever connected by an adjustable length rod assembly to a pivoting arcuate brake shoe. Pivot of the hand lever by a user of the wheelbarrow causes pivot of the shoe into contact with an inner cylindrical surface of the wheel of the brake. This type of braking system in which an arcuate shoe contacts an inner cylindrical surface of a rotating member is typically referred to as a drum brake system.

A wheelbarrow having another type of braking system known as a disc brake system is disclosed in U.S. Pat. No. 5,690,191 to Burbank. The Burbank reference discloses a brake disc supported on fastened spacers by a vertical surface of a tire rim and a U-shaped caliper which positions brake pads on opposing sides of the brake disc. An actuating cable secured to one of the pads extends in a first pass between the brake pads and is returned in a second pass through aligned openings in the pads. Bushings are located in the brake pad openings to facilitate passage of the cable. Actuation by a user of the wheelbarrow forces withdrawal of a portion of the cable in the first and second passes and pulls the pads towards one another.

The cable actuator system of Burbank fails to provide efficient transfer of the force applied to the cable into a braking force applied to the disc. The forced withdrawal of cable through the bend between the cable passes which is necessary for drawing the pads together generates frictional forces between the cable and the bushings. These frictional losses limit the effectiveness of the pulling force which is applied.

Furthermore, the teaching in Burbank of supporting the disc on fastened spacers from a vertical surface of the wheel fails to provide proper support for the disc. Support from the wheel rim in such a manner results in substantial runout wobble of the disc.

What is needed is an actuator for a disc type braking system for a wheelbarrow in which tension applied to a cable is efficiently converted into a braking force applied to the disc. The interacting cam members and cam grooves of the brake actuator of the present invention provides mechanical advantage and highly efficient conversion of the force applied to the cable into braking force applied to the disc. Furthermore, the actuator of the present invention has bidirectional operation providing for alternative application of the actuator in either a manual cable-applied/spring released braking system or an automatic spring applied/cable released system. A benefit of automatic braking is the ability to park the wheelbarrow on a slope without the need for blocking of the wheel. This allows for safe loading of the wheelbarrow with assurance that the wheelbarrow will not move when gravity forces overcome frictional forces acting on the wheelbarrow supports. Such a system also provides a useful safety feature in that the wheelbarrow would automatically brake in the event a user of the wheelbarrow were to unintentionally lose control over the wheelbarrow while operating the wheelbarrow.

SUMMARY OF THE INVENTION

According to the present invention there is provided an actuator for a braking system having a caliper. The actuator includes cam members supported by the caliper and a lever pivotably supported by the caliper for pivot about an axis. The lever includes variable depth cam grooves on opposite sides of the axis and is oriented with respect to the caliper for contact between the cam members and the cam grooves for translation of the lever away from the caliper upon pivot of the lever. The cam grooves preferably include intermediately located maximum depths which provide for a minimum separation lever position and translation of the lever away from the caliper in either of opposing first and second directions of pivot. The cam members are preferably spherical members movably retained in semispherical recesses in the caliper.

According to an embodiment of the present invention, the caliper is supported by a wheelbarrow having a rotatably supported disc. Translation of the lever away from the caliper results in translation of a brake pad into contact with the disc. The caliper is preferably slidably supported on pins in a bracket for translation of a second brake pad into contact with the disc opposite the first brake pad.

According to an embodiment of the present invention, an operator applied braking system includes a cable secured to the lever at a first end and to a cable actuator adjacent a second end for pivot of the lever in the first direction of pivot to effect braking of the disc. A return spring is preferably secured to the lever and to the wheelbarrow to effect a release of the disc upon release of the cable actuator.

According to an embodiment of the present invention, a spring of a spring applied braking system is preferably secured to the lever and to the wheelbarrow to pivot the lever in the second direction of pivot to effect braking of the disc. A cable is preferably secured to the lever for release of the disc upon use of a cable actuator by a user of the wheelbarrow.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE DRAWINGS

Figure 1:
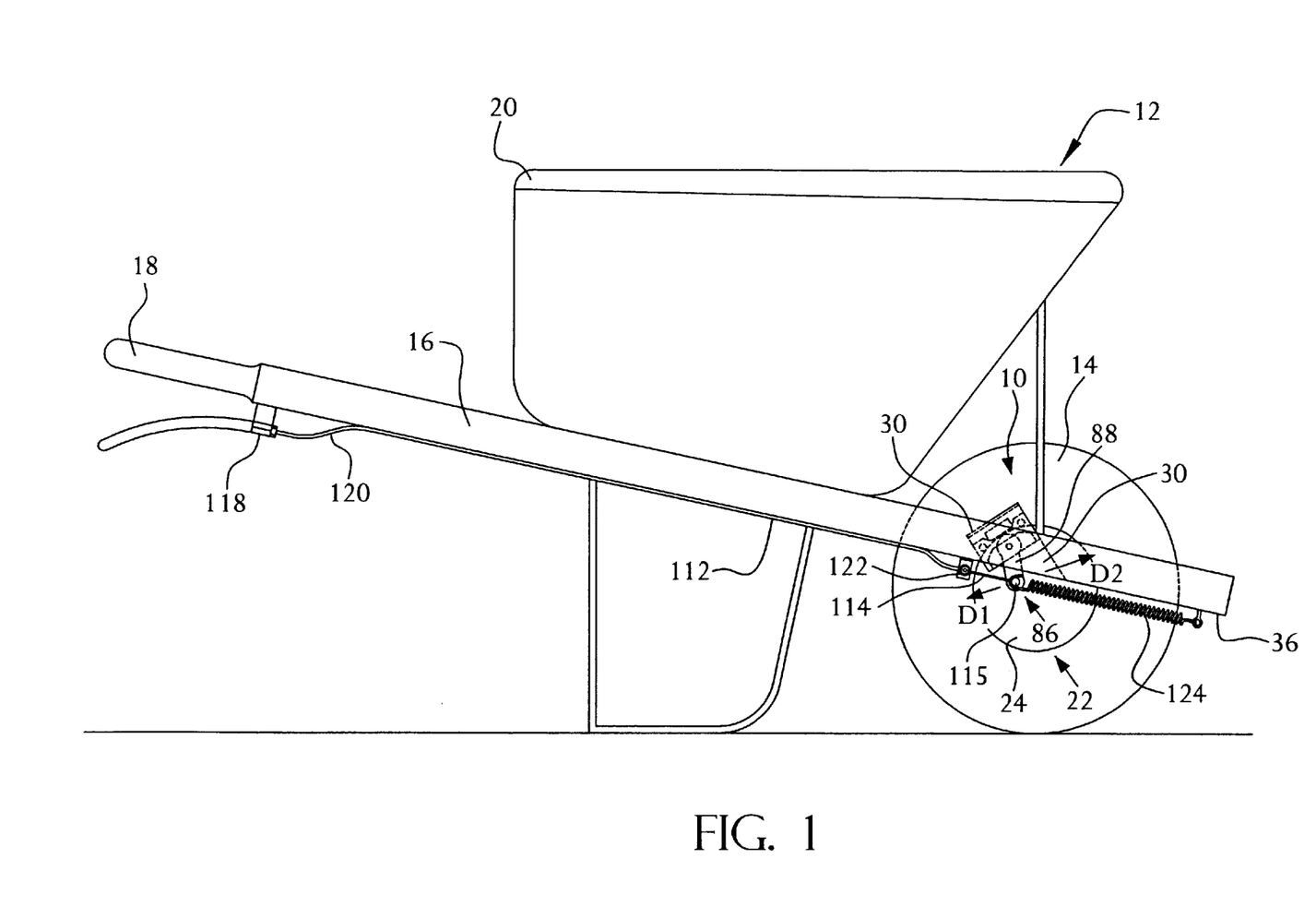
FIG. 1 is a side view of a wheelbarrow having a cable applied braking system according to the present invention.

Referring to the figures, where like numerals identify like elements, there is illustrated a braking system 10 according to the present invention for a wheelbarrow 12. Referring to FIG. 1, the wheel barrow 12, in the manner well known in the art, includes a wheel 14 rotatably secured to a pair of support members 16 which diverge rearwardly from the wheel 14 to integral handle portions 18. A tub 20 is supported by the support members 16 between the wheel 14 and the handle portions 18.

The braking system 10 includes a disc assembly 22 secured to the wheel 14 of the wheelbarrow 12 for rotation therewith. The disc assembly 22 includes a generally planar disc portion 24 and a cylindrical hub portion 26. The hub portion 26 of the disc assembly 22 is located behind the disc portion 24 in the perspective view of FIG. 2 and is shown in the sectional view of FIG. 3. The disc portion 24 is secured to the hub portion 26 by bolts 25 extending through the disc portion 24 for engagement in openings 26A in the hub portion 26. The wheel 14 of the wheelbarrow 12 includes an elongated hub 27A extending from a wheel rim 27B for rotation on an axle 27C. The axle 27C is supported in an axle bracket 27D which is attached to the wheelbarrow 12. The disc assembly 22 has a central aperture extending through the disc portion 24 and the hub portion 26, the aperture sized to allow the disc assembly to be slidably received on the elongated hub 27A. The hub portion 26 is clamped to the elongated hub 27A to restrain the disc assembly 22 against sliding. The clamping also secures the disc assembly 22 rotationally on the elongated hub 27A so that braking of the disc assembly 22 results in braking of the wheelbarrow 12.

Figure 3:
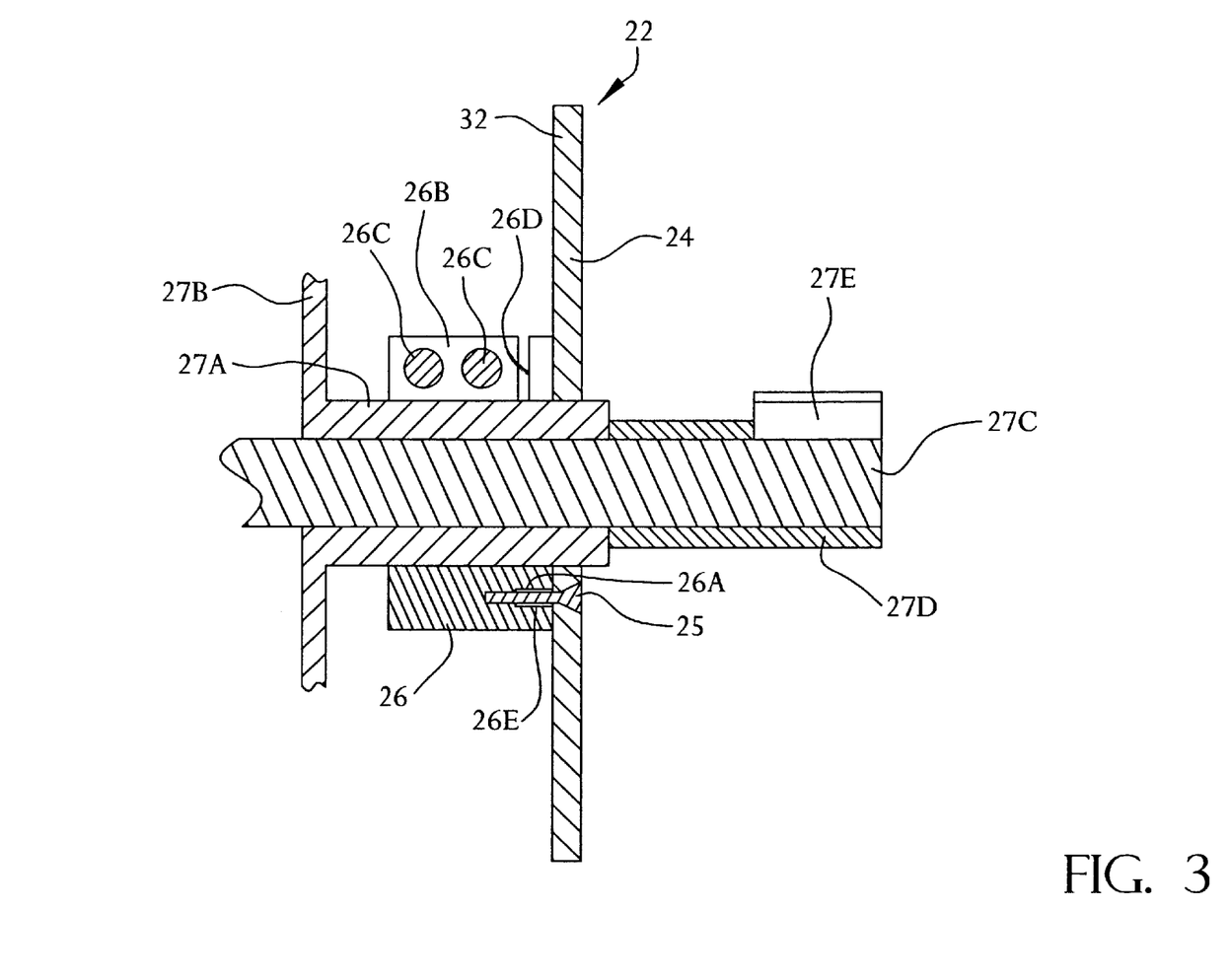
FIG. 3 is a partial sectional view taken along the lines 3—3 of FIG. 2.

The disc portion 26 includes a discontinuity which splits the disc portion along its length. An edge 26B, defining one side of the discontinuity, is seen in FIG. 3. A pair of clamping bolts 26C extend tangentially through the disc portion 26 across the discontinuity such that edge 26B and a confronting edge defining an opposite side of the discontinuity are deflected towards one another upon tightening of the clamping bolts. The deflection of the hub portion 26 results in a reduction of the aperture in the disc portion and compression between the disc portion 26 and the elongated hub 27A. A gap 26D extends tangentially on opposite sides of the discontinuity around a portion of disc portion 26. The gap 26D facilitates the deflection of the hub portion which might otherwise be restrained by the bolted connection between the disc portion 24 and the hub portion 26. As also seen in FIG. 3, counterbored portions 26E are provided in the openings 26A to further facilitate deflection of the hub portion 26. The disc assembly 22 may be rotationally secured to the elongated hub 27A by other means such as an interference fit or interfitting keyway surfaces for example. The exact manner in which a brake disc is secured to the wheel is not critical to the present invention. However, support of the disc by the wheelbarrow hub in the manner described will result in less runout wobble than securement of the disc to the rim of the wheelbarrow wheel, for example. Clamping of the disc assembly 22 to the elongated hub 27A in the manner described also provides for adjustability in the position of the disc portion 24 with respect to the wheel 14.

Figure 2:
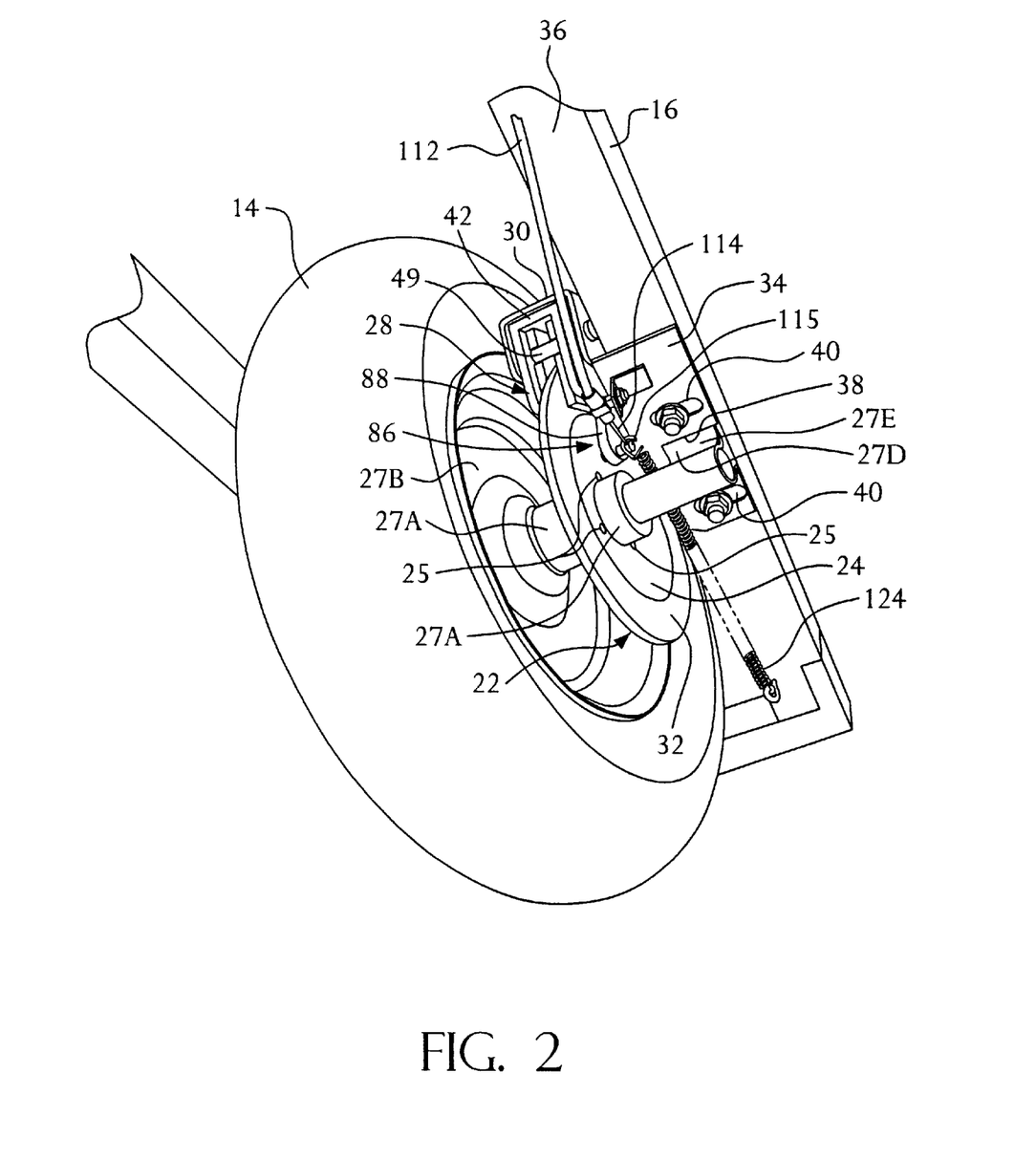
FIG. 2 is a partial perspective view showing the disc, caliper assembly and supporting bracket of the braking system of FIG. 1 with the wheel of the wheelbarrow removed.

Referring to FIG. 2, the braking system 10 includes a caliper assembly 28 which is supported by a bracket 30 for interaction between the caliper assembly and an outer peripheral portion 32 of the disc assembly 22, as will be described in more detail below. The bracket 30 includes an attachment portion 34 which is bolted to a lower surface 36 of the support arm 16 located on the side of the wheel 14 supporting the disc assembly 22. The bracket attachment portion 34 includes a cut-out 38 which allows for mounting of the bracket 30 over tab portions 27E of bracket 27D supporting the wheel 14. The attachment portion 34 further includes elongated slots 40 which provide adjustability in the relative positioning of the bracket 30 and disc assembly 22.

Figure 4A:
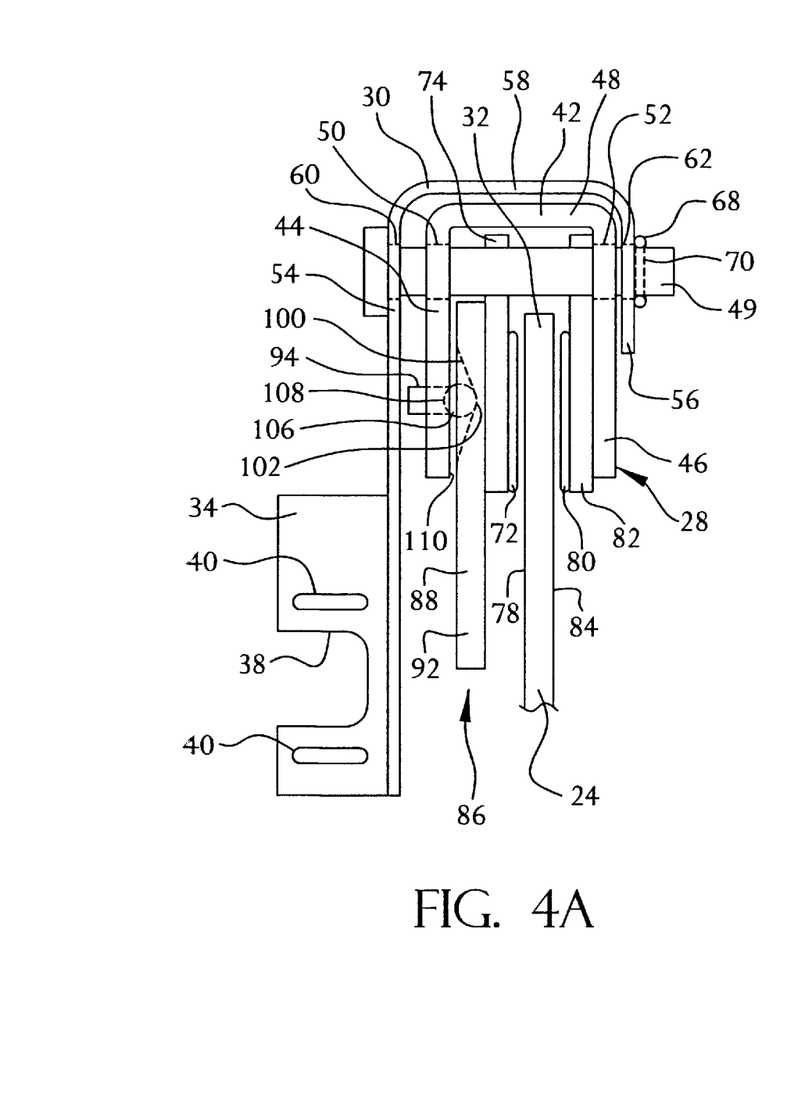
FIG. 4A is an end view of the disc, caliper assembly and supporting bracket of the braking system of FIG. 1 shown without supporting wheelbarrow and without lever connections in a non-braking condition.
Figure 4B:
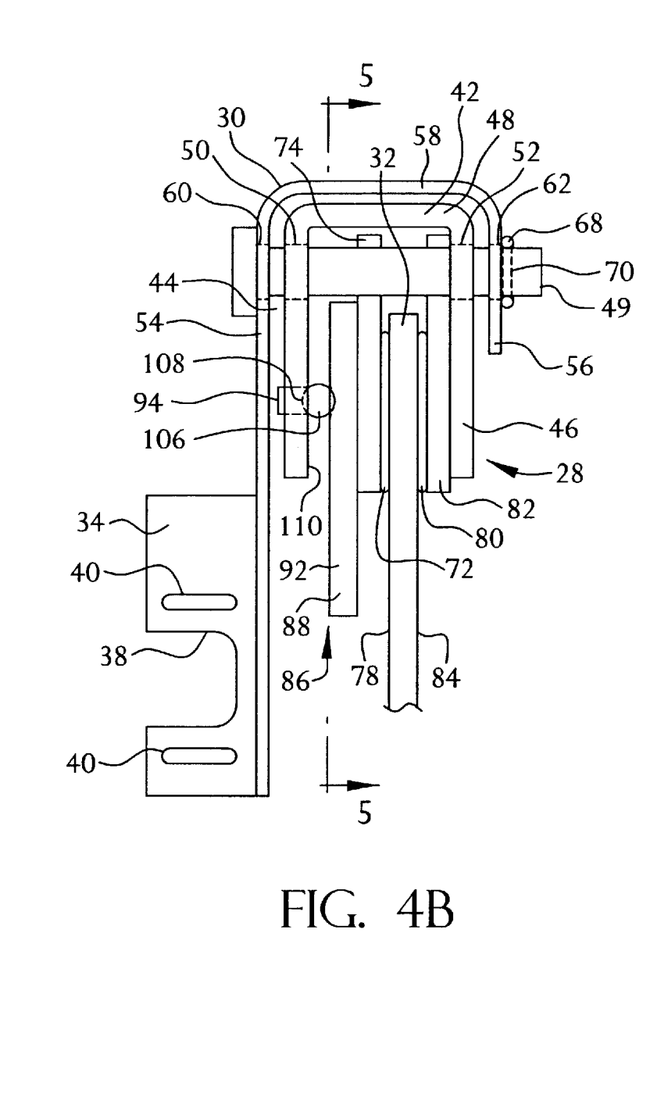
FIG. 4B is an end view, similar to FIG. 4B shown in a braking condition.

The caliper assembly 28 includes a generally U-shaped caliper 42 having a first sidewall 44 and an opposite second sidewall 46 interconnected by a transverse member 48. As best seen in FIGS. 4A and 4B, the caliper 42 is supported by the bracket 30 such that the outer peripheral portion 32 of disc assembly 22 extends into the space between the first and second sidewalls 44, 46 of caliper 42. The caliper 42 is supported on pins 49 which extend through openings 50 in first sidewall 44 and through openings 52 in second sidewall 46 which are aligned with openings 50. The pins allow the caliper 42 to translate with respect to bracket 30 on which it is supported. The bracket 30 includes a first support wall 54 extending transversely from an edge of attachment portion 34 at an oblique angle from the support member 16. The bracket 30 also includes a second support wall 56 opposite the first support wall 54 which is connected to the first support wall by a transverse member 58.

The caliper 42 is positioned between the first and second support walls 54, 56 of the bracket 30 so that the pins 49 slidably supporting caliper 42 extend through aligned openings 60,62 in the first and second support walls 54,56, respectively, of bracket 30. Retraction of the pins 49 from bracket 30 is prevented by cotter pins 68 extending through openings 70 in the pins 49. The described pin support of caliper 42 allows for translation of caliper 42 with respect to wheelbarrow 12 and more particularly with respect to the peripheral portion 32 of disc assembly 22 supported by wheel 14.

Figure 5:
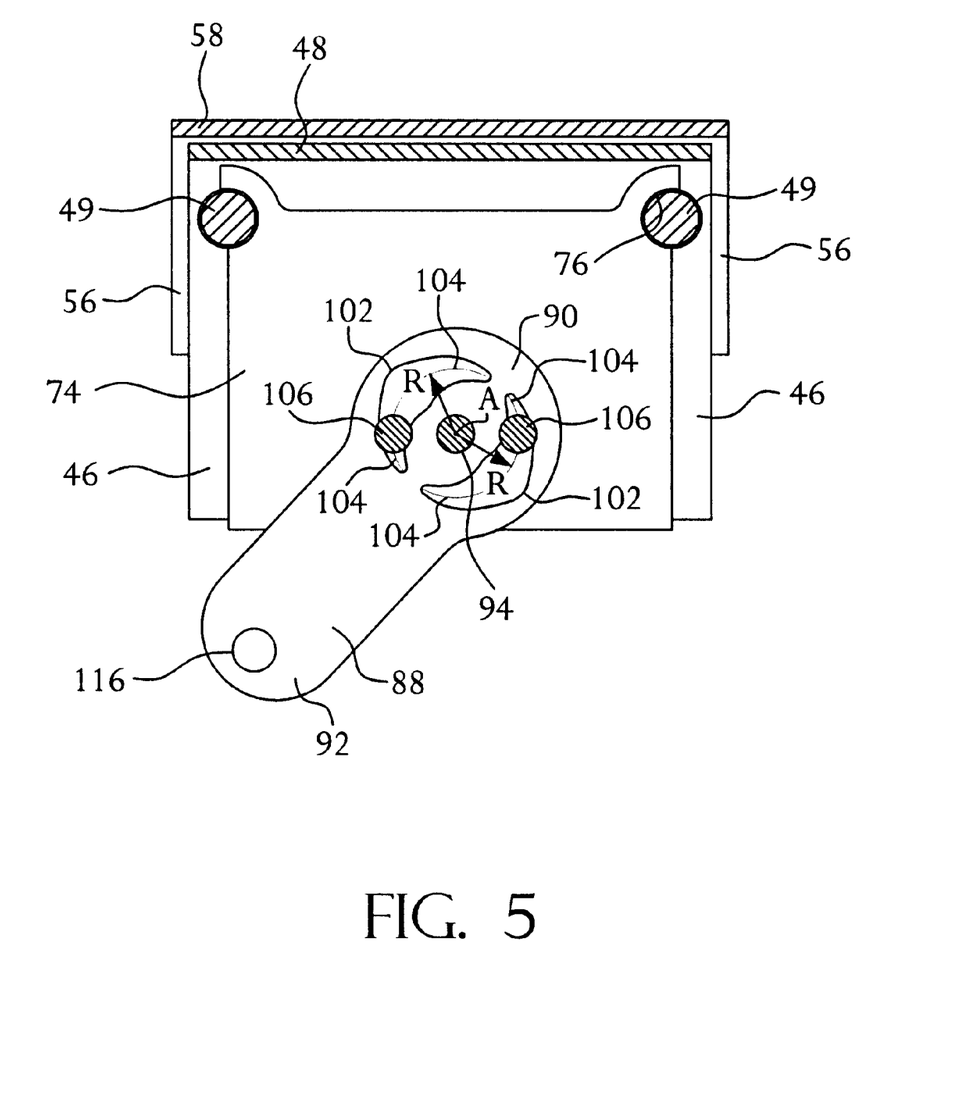
FIG. 5 is a sectional view taken along lines 5—5 of FIG. 4B.

The caliper assembly 28 includes a first brake pad 72 secured to a first support plate 74. The brake pad is made of a friction material, such as the materials well known in the art in two categories of material, namely: semimetallics and non-asbestos organics (NAO). As best seen in FIG. 5 the first support plate 74 includes openings, which may be either holes or semicircular notches 76 in opposing edges of the first support plate 74 for support of the plate by the pins 49 extending through the caliper 42. The pin support of the first support plate 74 allows for translation of the first support plate with respect to the bracket 30 and wheelbarrow 12 to which the bracket is secured. The first support plate 74 is positioned in the caliper 42 between the first sidewall 44 and a first surface 78 of the disc portion 24 of disc assembly 22 such that the first brake pad 72 confronts the first surface 78 of disc portion 24. The caliper assembly 28 further includes a second brake pad 80 secured to a second support plate 82 which are similar in construction as the first brake pad 72 and the first support plate 74. The second support plate 82 is positioned in the caliper 42 between the second sidewall 46 and a second surface 84 of the disc portion 24 of disc assembly 22 such that the second brake pad 80 confronts the second surface 84 of disc portion 24.

The caliper assembly 28 further includes a brake actuator 86 which provides for translation of the first and second brake pads 72, 80 with respect to the disc assembly 22 in a manner utilizing mechanical advantage and a highly efficient conversion of force applied to the actuator to a braking force applied to the disc. The brake actuator 86 includes a lever 88 having a cam portion 90 and an elongated arm portion 92 extending from an edge of the cam portion 90. A support post 94 extends perpendicularly from a first surface 96 of the lever 88 at an intermediate location of the cam portion 90. The support post 94 is received in an opening 98 in the first sidewall 44 of caliper 42 and provides for pivotable movement of the lever 88 with respect to the caliper 42 about a pivot axis defined by the post 94 and the opening 98 and identified as A in FIG. 5.

The lever 88 includes a pair of cam grooves 100 extending oppositely from one another at a radius, shown as R in FIG. 5, from the pivot axis A. Each of the cam grooves, as best seen by the phantom lines in FIG. 4A, has a variable depth and includes a maximum depth location 102 which is intermediately located along the groove between ramping end portions 104. The brake actuator 86 includes a pair of spherical cam members 106 which are moveably supported in semispherical recesses 108 formed in an inner surface 110 of the first sidewall 44 of caliper 42. The cam members 106 are positioned on the caliper 42 such that when the support post 94 of lever 88 is positioned in the opening 98 in the first sidewall 44 of caliper 42 the cam grooves 100 confront the cam members 106. The confronting relationship of the cam grooves 100 and the cam members 106 provides for sliding contact between the cam members 106 and the cam grooves 100 as the lever 88 is pivoted about the pivot axis A. The intermediate maximum depth locations 102 of cam grooves 100 provide for a position of lever 88 associated with a minimum separation of the lever 88 from the first sidewall 44 of caliper 42 which occurs when the cam members 106 are located at the maximum depth locations 102 of cam grooves 100. The inclusion of ramp portions 104 on either side of the maximum depth location 102 provides for translation of the lever 88 away from the first sidewall 44 when the lever 88 is pivoted in either of a first direction of pivot, D1, or an opposite second direction of pivot, D2, from the minimum separation position of lever 88.

Referring to FIG. 2, the braking system 10 includes a cable 112 having a first end 114 secured to the arm portion 92 of lever 88 by a pin member 115 extending through an opening 116 in the arm portion 92. A cable actuator 118 is secured to one of the support members 16 adjacent to the handle portion 18 and to the cable 112 at a second end 120 of cable 112. The braking system 10 also includes a cable support 122 securing the cable 112 to the support member 16 adjacent to the caliper assembly 28.

The braking system 10 shown in FIG. 1 is a manually applied braking system in which operation of the cable actuator 118 by a user of the wheelbarrow 12 results in braking of the wheelbarrow in the following manner. Referring to FIG. 4A, the caliper assembly 28 is illustrated in a non-braking configuration prior to use of the cable actuator 118 by a user of the wheelbarrow 12. Operation of cable actuator 118 causes a rearward translation of the cable 112 with respect to the wheelbarrow 12 and a corresponding pivot of lever 88 in the first direction of pivot, D1. The ramping end portions 104 of cam grooves 100 slide on cam members 106 causing translation of lever 88 away from the first sidewall 44 of caliper 42. The translating lever 88 causes first support plate 74 to slide on pins 49 until the first brake pad 72 contacts the first surface 78 of the disc portion 24 of disc assembly 22. Because the bracket 30 and the disc assembly 22 will not translate with respect to the wheelbarrow 12, further translation of lever 88 away from the first sidewall 44 after contact between the first brake pad 72 and the first surface 78 of disc portion 24 causes caliper 42 to slide along pins 49. The sliding of caliper 42 on pins 49 causes translation of the second support plate 82 until the second brake pad 80 is brought into contact with the second surface 84 of disc portion 24, as seen in FIG. 4B which illustrates the caliper assembly 28 in a braking configuration. The braking system 10 further includes a return spring 124 secured to pin member 115 at a first end and secured at an opposite end to the support member 16. The return spring 124 functions to pivot the lever 88 back toward the minimum separation position of lever 88 effecting a release of the disc assembly 22.

Figure 6:
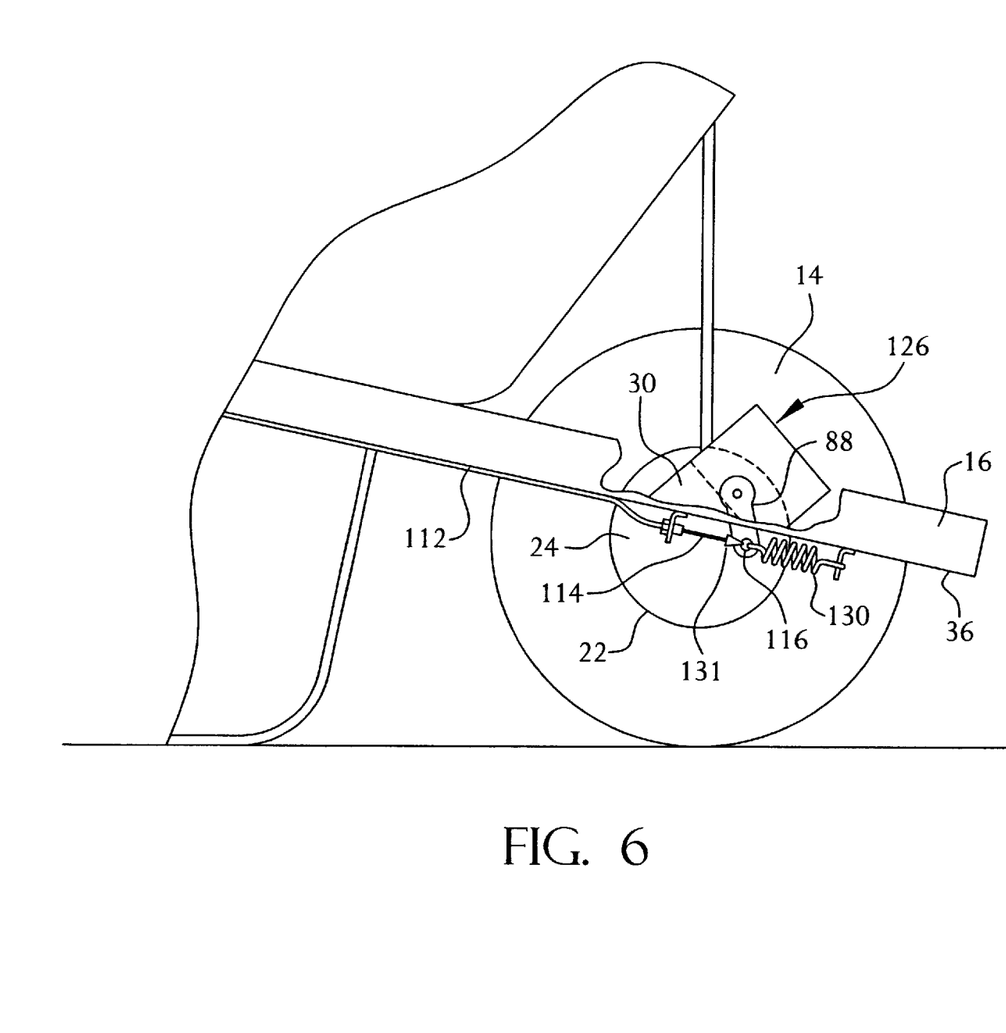
FIG. 6 is a partial side view of a wheelbarrow having a spring applied braking system with manual release according to the present invention.

Referring to FIG. 6, an alternative to the manual cable applied/spring-release braking system 10 of the previous figures is illustrated. A braking system 126 is shown in which the caliper assembly 28 is mounted in a bracket 128 which positions the caliper assembly 28 forwardly of the axle supporting wheel 14 for interaction with the disc assembly 22. This configures the caliper assembly 28 and the disc assembly 22 for an automatic braking system in which the braking force must be manually released by a user of the wheelbarrow. This alternative configuration utilizes the bidirectional actuation capability of the lever 88 in the following manner. A spring 130 is secured at one end directly to the opening 116 in lever 88 and at an opposite end to support member 16. A pivot bracket 131 is secured to the opening 116 and connects end 114 of cable 112 to lever 88 opposite spring 130. The spring 130 is a heavier spring than return spring 124 applying a larger force to the lever 88 to urge lever 88 in the second direction of pivot, D2, from the minimum separation position of lever 88. The force applied to lever 88 by spring 130 is sufficient to place the caliper assembly 28 in a braking configuration similar to that of FIG. 4B in which the brake pads 72, 80 contact respective surfaces 78, 84 of disc portion 24. The spring force must also be sufficiently strong as to cause compressive force between the brake pads 72, 80 and the respective surfaces 78, 84 of disc portion 24 effecting an automatic braking of disc portion 24 and the wheel 14 to which disc portion 24 is attached. In the configuration of the braking system 126, operation of the cable actuator 118 by a user of the wheelbarrow results in pivot of the lever 88 back toward the minimum separation position of lever 88 thereby effecting a release of disc portion 24 and the wheel 14 to which disc portion 24 is attached.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the recitation of the appended claims.

What is claimed is:

1. A braking system for a wheelbarrow, said braking system comprising:

a caliper operably supported by said wheelbarrow and having a first sidewall, and a semispherical recess formed in the first sidewall;

at least one cam member located in the semispherical recess formed in the first sidewall of said caliper;

a brake disc rotatably supported by said wheelbarrow and having opposite first and second surfaces;

a lever pivotably supported by said caliper such that at least a portion of said lever is located between the first surface of said brake disc and the first sidewall of said caliper, at least one cam groove formed on the lever on a surface facing the caliper, said cam groove having a depth which varies along at least a portion of said groove from a maximum depth to a minimum depth, said at least one cam member being located within the groove and adapted to move along the surface of the groove, movement of the cam member within the groove causing translation of said lever toward and away from the first sidewall of said caliper upon pivoting of said lever; and a first brake pad supported by said wheelbarrow, at least a portion of said first brake pad located between said lever and the first surface of said brake disc such that said translation of said lever away from said caliper results in translation of said first brake pad toward the first surface of said brake disc.

2. The braking system according to claim 1 further including a bracket secured to said wheelbarrow, said bracket slidably supporting said caliper and said first brake pad such that translation of said lever after said contact between said first brake pad and the first surface of said brake disc results in translation of said caliper with respect to said bracket.

3. The braking system according to claim 2, further including a second brake pad operably and slidably supported by said bracket, at least a portion of said second brake pad located between the second surface of said brake disc and a second sidewall of said caliper such that said translation of said caliper with respect to said bracket results in contact between the second brake pad and the second surface of said brake disc.

4. The braking system according to claim 3, further including at least two pins supported by said bracket, each of said pins extending through aligned openings in the first and second sidewalls of said caliper.

5. The braking system according to claim 4, wherein said bracket includes first and second support walls and wherein said caliper is positioned between said support walls such that each of said pins extends through aligned openings in said first and second support walls.

6. The braking system according to claim 5 further including at least two cotter pins to secure said pins to said bracket, each of said cotter pins extending through an opening in said pin to prevent retraction of said pins from the aligned openings in said bracket.

7. The braking system according to claim 1, wherein said disc is secured to a hub to form a disc assembly and wherein the hub of said disc assembly is secured to an elongated hub of said wheel for rotation therewith.

8. A braking system for a wheelbarrow, said braking system comprising:

a caliper operably supported by said wheelbarrow and having a first sidewall;

at least two cam members supported by the first sidewall of said caliper;

a brake disc rotatably supported by said wheelbarrow and having opposite first and second surfaces;

a lever pivotably supported by said caliper such that at least a portion of said lever is located between the first surface of said brake disc and the first sidewall of said caliper, said lever including at least two cam grooves in a surface of said lever extending at a radius from said pivot axis oppositely from each other with respect to said pivot axis, each of said cam grooves having a depth which varies along at least a portion of said groove, said lever oriented with respect to said caliper such that each of said cam grooves contacts one of said cam members for translation of said lever away from the first sidewall of said caliper upon pivot of said lever; and a first brake pad operably and slidably supported by said wheelbarrow, at least a portion of said first brake pad located between said lever and the first surface of said brake disc such that said translation of said lever away from said caliper results in translation of said first brake pad with respect to said wheelbarrow and contact between said first brake pad and the first surface of said brake disc, wherein a maximum depth of each of the cam grooves of said lever is located intermediately with respect to the variable depth portion of said groove and oppositely of the maximum depth of the other of said cam grooves with respect to said pivot axis, the intermediately located maximum depths of said cam grooves providing for a lever position associated with a minimum separation of said lever from said caliper and further providing for translation of said lever away from said caliper upon pivot of said lever in either of opposing first and second directions of pivot from said minimum separation lever position.

9. The braking system according to claim 8, further including a cable having a first end secured to said lever at a distance from said pivot axis and an opposite second end, said braking system further including a cable actuator secured to said wheelbarrow and secured to said cable adjacent the second end of said cable such that operation of said cable actuator by a user of said wheelbarrow results in pivot of said lever in said first direction of pivot from said minimum separation lever position to effect braking of said disc.

10. The braking system according to claim 9, further including a return spring having a first end secured to said lever opposite said cable and an opposite second end secured to said wheelbarrow such that release of said cable actuator by the user of said wheelbarrow results in a returning pivot of said lever toward said minimum separation lever position to effect a release of said disc.

11. The braking system according to claim 8, further including a brake applying spring having a first end secured to said lever at a distance from said pivot axis and an opposite second end secured to said wheelbarrow such that said spring applies a force to said lever resulting in pivot of said lever in said second direction of pivot from said minimum separation lever position to effect braking of said disc.

12. The braking system according to claim 11, further including a cable having a first end secured to said lever opposite said brake applying spring and an opposite second end, said braking system further including a cable actuator secured to said wheelbarrow and secured to said cable adjacent the second end of said cable such that operation of said cable actuator by a user of said wheelbarrow results in pivot of said lever toward said minimum separation lever position to effect a release of said braking applied by said brake applying spring.

13. A braking system for a wheelbarrow, said braking system comprising:

a brake disc rotatably supported by said wheelbarrow and having opposite first and second surfaces;

a caliper supported by said wheelbarrow and having first and second sidewalls located on opposite sides of the brake disc, and a recess formed in the first sidewall;

at least one cam member located in the recess in the first sidewall;

a lever pivotably supported by the caliper between the first sidewall of the caliper and the first surface of the brake disc, at least one cam groove formed on the lever on a surface facing the first sidewall of the caliper, the cam groove having a depth which tapers along at least a portion of the groove, the cam member being located within the groove and adapted to slide along the tapered depth of the groove upon pivoting of the lever with respect to the caliper, the movement of the cam member within the groove causing the lever to translate toward and away from the first sidewall of said caliper; and a first brake pad located between the lever and the first surface of said brake disc such that translation of said lever away from said caliper urges the first brake pad into contact with the first surface of said brake disc.

14. A braking system according to claim 13 further comprising a second brake pad located between the second surface of the brake disc and the second sidewall of the caliper, at least the first brake pad being slidably mounted to the wheelbarrow such that pivoting of the lever with respect to the caliper causes the first brake pad to slide toward the brake disc.

15. A braking system according to claim 14 wherein the caliper is slidably mounted to the wheelbarrow such that pivoting of the lever with respect to the caliper causes the second sidewall of the caliper to slide toward the brake disc, the sliding of the second sidewall urging the second brake pad into contact with the second surface of the brake disc.

16. A braking system according to claim 13 wherein there are two cam members and two recesses, each cam member being located within a corresponding recess in the caliper, the recesses have a semi-spherical shape; and wherein there are two grooves formed in the lever, the grooves tapering in the same circumferential direction.

17. A braking system for a wheelbarrow, said braking system comprising:

a brake disc rotatably supported by said wheelbarrow and having opposite first and second surfaces;

a caliper supported by said wheelbarrow and having first and second sidewalls located on opposite sides of the brake disc;

at least one cam member;

a lever pivotably supported by the caliper between the first sidewall of the caliper and the first surface of the brake disc, the lever having a recess formed in a surface of the lever facing the caliper, the cam member being located within the recess;

at least one cam groove formed in the first sidewall of the caliper facing recess, the groove having a depth which tapers along at least a portion of the groove, the cam member being located within the groove and adapted to slide along the tapered depth of the groove upon pivoting of the lever with respect to the caliper, the movement of the cam member within the groove causing the lever to translate toward and away from the first sidewall of said caliper; and a first brake pad located between the lever and the first surface of said brake disc such that translation of said lever away from said caliper urges the first brake pad into contact with the first surface of said brake disc.

18. A braking system according to claim 17 further comprising a second brake pad located between the second surface of the brake disc and the second sidewall of the caliper, at least the first brake pad being slidably mounted to the wheelbarrow such that pivoting of the lever with respect to the caliper causes the first brake pad to slide toward the brake disc.

19. A braking system according to claim 18 wherein the caliper is slidably mounted to the wheelbarrow such that pivoting of the lever with respect to the caliper causes the second sidewall of the caliper to slide toward the brake disc, the sliding of the second sidewall urging the second brake pad into contact with the second surface of the brake disc.

20. A braking system according to claim 17 wherein there are two cam members and two recesses, each cam member being located within a corresponding recess in the lever, each recess having a semispherical shape; and wherein there are two grooves formed in the caliper, the grooves tapering in the same circumferential direction.

21. An actuator for a braking system having a caliper, said actuator comprising:

at least two cam members supported by said caliper; and a lever supported by said caliper for pivot of said lever about a pivot axis, said lever including at least two cam grooves in a surface of said lever extending at a radius from said pivot axis oppositely from each other with respect to said pivot axis, each of said cam grooves having a depth which varies along at least a portion of said groove, said lever oriented with respect to said caliper such that each of said cam grooves contacts one of said cam members for translation of said lever away from said caliper upon pivot of said lever;

wherein the depth of each of the grooves varies from a maximum depth located at approximately the center of each groove to minimum depths on either side of the maximum depth, the intermediately located maximum depths of said cam grooves providing for a lever position associated with a minimum separation of said lever from said caliper and further providing for translation of said lever away from said caliper upon pivot of said lever in either of opposing first and second directions of pivot from said minimum separation lever position.

22. The actuator according to claim 21, wherein each of the cam members is spherical and is moveably retained in a semispherical recess in a surface of said caliper.

* * * * *